(12) United States Patent
van de Ven

(10) Patent No.: US 9,918,366 B2
(45) Date of Patent: *Mar. 13, 2018

(54) LIGHTING DEVICE WITH VARIABLE COLOR RENDERING

(71) Applicant: Cree, Inc., Durham, NC (US)

(72) Inventor: Antony Paul van de Ven, Sai Kung (HK)

(73) Assignee: CREE, INC., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,046

(22) Filed: Jun. 19, 2015

(65) Prior Publication Data
US 2015/0289340 A1  Oct. 8, 2015

Related U.S. Application Data

(63) Continuation of application No. 13/561,388, filed on Jul. 30, 2012, now Pat. No. 9,066,405.

(51) Int. Cl.
*H05B 37/02* (2006.01)
*H05B 33/08* (2006.01)

(52) U.S. Cl.
CPC ..... *H05B 33/0872* (2013.01); *H05B 33/0854* (2013.01); *H05B 33/0869* (2013.01)

(58) Field of Classification Search
CPC .... H05B 33/08; H05B 37/02; H05B 33/0815; H05B 33/0845; H05B 33/0851; H05B 33/0854; H05B 33/0869; H05B 33/0872
(Continued)

(56) References Cited

U.S. PATENT DOCUMENTS 6,441,558 B1  8/2002 Muthu et al.
6,498,440 B2 12/2002 Stam et al.
(Continued)

FOREIGN PATENT DOCUMENTS

WO       03096761 A1  11/2003
WO    2014022067 A2   2/2014

OTHER PUBLICATIONS

National Institute of Standards and Technology, "Color Rendering of Light Sources," http://physics.nist.gov/Divisions/Div844/facilities/vision/color.html, accessed Mar. 11, 2009, 7 pages.
(Continued)

*Primary Examiner* — Tung X Le
(74) *Attorney, Agent, or Firm* — Withrow & Terranova, P.L.L.C.; Vincent K. Gustafson

(57) ABSTRACT

The present disclosure relates to an LED-based lighting component that can control the color rendering capability of its generated light based on the presence or characteristics of ambient light. In one embodiment, the lighting component may employ at least two different types of LEDs to generate light. Control circuitry of the lighting component is able to monitor ambient light and drive the LEDs based on an ambient light characteristic that is indicative of the CRI of the ambient light. If the ambient light characteristic is indicative of the ambient light having a lower CRI, the control system will drive the LEDs to emit light with a defined CRI. If the ambient light characteristic is indicative of the ambient light having a higher CRI, the control system will drive the LEDs to emit light with a reduced CRI, which is lower than the defined CRI.

20 Claims, 10 Drawing Sheets

(58) Field of Classification Search
USPC .... 315/149–159, 185 R, 291, 294, 297, 307, 315/308, 312
See application file for complete search history.

(56) References Cited

U.S. PATENT DOCUMENTS

| | | | |
|---|---|---|---|
| 6,998,594 B2 | 2/2006 | Gaines et al. | |
| 7,095,056 B2 | 8/2006 | Vitta et al. | |
| 7,208,888 B2 | 4/2007 | Lovato et al. | |
| 9,066,405 B2 | 6/2015 | van de Ven | |
| 2004/0195975 A1 | 10/2004 | Fregoso | |
| 2005/0078056 A1 | 4/2005 | Childers | |
| 2005/0127381 A1* | 6/2005 | Vitta | F21K 9/00 257/88 |
| 2005/0237733 A1 | 10/2005 | Laski et al. | |
| 2006/0149607 A1 | 7/2006 | Sayers et al. | |
| 2008/0191631 A1* | 8/2008 | Archenhold | H05B 33/0818 315/158 |
| 2008/0215279 A1 | 9/2008 | Salsbury et al. | |
| 2009/0160363 A1 | 6/2009 | Negley et al. | |
| 2010/0026187 A1 | 2/2010 | Kelly et al. | |
| 2010/0270567 A1 | 10/2010 | Emerson et al. | |
| 2010/0301777 A1 | 12/2010 | Kraemer | |
| 2011/0068698 A1 | 3/2011 | Swoboda et al. | |
| 2011/0068702 A1 | 3/2011 | van de Ven et al. | |
| 2011/0175510 A1* | 7/2011 | Rains, Jr. | C09K 11/574 313/32 |
| 2011/0182065 A1 | 7/2011 | Negley et al. | |
| 2011/0204778 A1 | 8/2011 | Sadwick et al. | |
| 2011/0254554 A1* | 10/2011 | Harbers | H05B 33/0893 324/414 |
| 2011/0279015 A1 | 11/2011 | Negley et al. | |
| 2012/0025235 A1 | 2/2012 | Van De Ven et al. | |
| 2012/0229032 A1 | 9/2012 | Van De Ven et al. | |
| 2012/0286699 A1* | 11/2012 | Yan | H05B 33/0866 315/294 |
| 2012/0306375 A1 | 12/2012 | van de Ven | |
| 2013/0293114 A1* | 11/2013 | Tipirneni | H05B 33/086 315/151 |
| 2014/0028197 A1 | 1/2014 | van de Ven | |
| 2014/0152188 A1 | 6/2014 | Bora et al. | |

OTHER PUBLICATIONS

International Search Report and Written Opinion for PCT/US2013/049903, dated May 19, 2014, 10 pages.
International Preliminary Report on Patentability for PCT/US2013/049903, dated Feb. 12, 2015, 8 pages.
Non-Final Office Action for U.S. Appl. No. 13/561,388, dated Jul. 1, 2014, 6 pages.
Notice of Allowance for U.S. Appl. No. 13/561,388, dated Dec. 9, 2014, 8 pages.
Notice of Allowance for U.S. Appl. No. 13/561,388, dated Feb. 20, 2015, 5 pages.

* cited by examiner

LIGHTING DEVICE WITH VARIABLE COLOR RENDERING

CROSS-REFERENCE TO RELATED APPLICATION(S)

This application is a continuation of U.S. patent application Ser. No. 13/561,388 filed on Jul. 30, 2012 and subsequently issuing as U.S. Pat. No. 9,066,405 on Jun. 23, 2015, wherein the foregoing patent application and patent are hereby incorporated by reference herein.

FIELD OF THE DISCLOSURE

The present disclosure relates to a high quality solid-state lighting device that can control the color rendering capability of its emitted light based on ambient light.

BACKGROUND

The color quality of a light source relates to the ability of the light source to faithfully reproduce the colors of objects illuminated by the light source, in comparison with natural light. As expected, the color quality of the light source is an important characteristic of the light source in general, and to consumers in particular. Most consumers want an object that appears red in natural light to appear the same color of red when illuminated by the light source. For example, a light source with poor color quality may cause the red object to appear anywhere from orange to brown when illuminated.

The Color Rendering Index (CRI) is a measure of the relative color quality of a light source with respect to natural light. The CRI is the only internationally accepted standard for measuring color quality and is defined by the International Commission on Illumination (CIE or Commission internationale de l'éclairage). At a high level, the CRI for a light source is calculated by initially measuring the color appearance of 14 reflective samples of different defined hues under both a reference source and the light source being measured. The measured color appearances are then modified for chromatic adaptation with a Von Kires correction. After modification, the difference in the color appearance for each reflective sample i is referred to as the color appearance difference, $\Delta E_i$.

Based on the corresponding color appearance difference, $\Delta E_i$, a special CRI, $R_i$, is calculated for each reflective sample using the formula: $R_i=100-4.6\Delta E_i$. To calculate the general CRI, $R_a$, for the light source, an average of the special CRI, $R_i$, for only the first eight of the reflective samples is calculated, wherein:

$$R_a = \frac{1}{8}\sum_{i=1}^{8} R_i$$

A perfect CRI of 100 indicates that there are essentially no color differences for any of the eight reflective samples that are used to calculate the general CRI $R_a$.

For reference, natural sunlight has a high CRI $R_a$ of approximately 100, and incandescent light has a CRI $R_a$ of 95 or greater. Florescent lighting is less accurate and generally has a CRI $R_a$ of 70-80, which is on the lower end of what is acceptable for residential and indoor commercial lighting applications. Street lamps that use mercury vapor or sodium lamps often have a relatively poor CRI $R_a$ of around 40 or lower.

The CRI of a light source only considers color rendering, as the name implies, and ignores many other attributes that impact overall color quality, such as chromatic discrimination and common observer preferences. Even as a measure of color rendering, CRI is calculated using only eight of the 14 reflective samples, as noted above. These eight reflective samples are all of low to medium chromatic saturation and do not span the range of normal visible colors. Thus, the CRI calculations do not take into consideration the ability of the light source to properly render highly saturated colors. As a result, light sources that render colors of low saturation well, but perform poorly with highly saturated colors can achieve relatively high CRIs, while light sources that afford high chromatic discrimination are pleasing to the common observer, and perform relatively well for colors at all saturation levels may have a relatively low CRI.

The use of the CRI as a reliable color quality metric for solid-state lighting sources, such as those employing light emitting diodes (LEDs), is particularly problematic given the inherently peaked light spectrum of LEDs. Depending on how the spectrum of a given LED light source aligns with the reflective samples used to calculate the CRI, the resulting CRI may not be a fair representation of the perceived color quality of the LED light source in comparison with other LED light sources with different light spectra as well as with other traditional light sources. For example, a well-designed LED lighting source with a lower CRI $R_a$ of 80 may be perceived as having a much more accurate and pleasing color rendering than a florescent lighting source with same CRI $R_a$ of 80. Similarly, a first LED lighting source that is engineered to achieve a higher CRI $R_a$ of 90 may not be perceived as being able to render colors as well as a second LED lighting source with a lower CRI $R_a$.

Given the limitations of the CRI as a measure of color quality for solid-state lighting devices, a new color quality metric, which is referred to as the Color Quality Scale (CQS), has been developed by the National Institute of Standards and Technology (NIST). Instead of using only eight low-chroma samples that do not span the full range of hues, the CQS takes in to consideration 15 Munsell samples that have much higher chroma and are spaced evenly along the entire hue circle. CQS also takes in to consideration various other characteristics that have been determined to impact an observer's perception of color quality. The CQS has a range of 0-100, with 100 being a perfect score. The details of how CQS is measured as of the date of filing is provided in Appendix A, an article entitled "Color Rendering of Light Sources," from the National Institute of Standards and Technology web site (http://physics.nist.gov/Divisions/Div844/facilities/vision/color.html), accessed on Mar. 11, 2009 and incorporated herein by reference in its entirety.

Accordingly, CRI and CQI provide exemplary, but non-limiting, color rendering metrics upon which the color rendering of alight source are judged.

SUMMARY

The present disclosure relates to an LED-based lighting component that can control the color rendering capability of its generated light based on the presence or characteristics of ambient light. In one embodiment, the lighting component may employ at least two different types of LEDs to generate light. Control circuitry of the lighting component is able to monitor ambient light and drive the LEDs based on an ambient light characteristic that is indicative of the CRI of the ambient light. If the ambient light characteristic is indicative of the ambient light having a lower CRI, the control system will drive the LEDs to emit light with a defined CRI. If the ambient light characteristic is indicative of the ambient light having a higher CRI, the control system will drive the LEDs to emit light with a reduced CRI, which is lower than the defined CRI.

For instance, when there is no ambient light or ambient light having a lower CRI, the lighting component may operate normally and emit light having the defined CRI. In the presence of significant ambient light from sunlight, which naturally has a high CRI, or other source that is capable of providing ambient light with a relatively high CRI, the lighting component may adjust how the LEDs are driven to emit light at a lower CRI. The reduction in CRI of the emitted light may correspond to an increase in overall system efficiency, efficacy of the emitted light, a reduction in power consumption, or the like while maintaining perceived brightness.

In a first embodiment, a lighting component is provided with a plurality of LEDs and control circuitry for driving the plurality of LEDs. The control circuitry is adapted to monitor an ambient light characteristic of ambient light through an ambient light sensor, a separate LED, or one of the plurality of LEDs. In response to the monitored ambient light characteristic, the control circuitry may either: drive the LEDs to provide light having a reduced color rendering metric, if the ambient light characteristic is indicative of the ambient light having a higher color rendering metric, or drive the LEDs to provide light having a normal color rendering metric, if the ambient light characteristic is indicative of the ambient light having a lower coloring rendering metric. In this embodiment, the reduced color rendering metric is lower than the normal color rendering metric.

The plurality of LEDs may have at least one LED of a first type and at least one LED of a second type, wherein the control circuitry is adapted to drive the at least one LED of the first type with less current when providing the light with the reduced color rendering metric than when providing the light with the normal color rendering metric.

In certain configurations, the LED of the first type is less efficient than the LED of the second type and may provide light with the ambient lighting characteristic more effectively than the LED of the second type. The LED of the first type may be less efficient than the LED of the second type, and may provide light with the ambient lighting characteristic more effectively than the LED of the second type.

As an example, the LED of the first type may generate a predominantly reddish light and the LED of the second type may generate predominantly either a greenish or yellowish light such that the reddish light from the at least one LED of the first type and the greenish or yellowish light from the at least one LED of the second type mix to provide white light. As such, the ambient light characteristic of the ambient light that is being monitored may correspond to an amount of reddish light in the ambient light. In more general terms, the LED of the first type generates predominantly a first color of light and the LED of the second type generates predominantly a second color of light that is different from the first color of light. The first color of light from the LED of the first type and the second color of light from the LED of the second type mix to provide white light.

In another example, the LED of the first type generates predominantly a white light at a lower efficiency, and the LED of the second type generates white light at a higher efficiency. As such, the white light from the LED of the first type and the white light from the LED of the second type mix to provide white light at a desired color temperature.

The color rendering metric in select embodiments corresponds to CRI or CQI. Further, the ambient light sensor may take on different configurations. In a first configuration, the ambient light sensor is separate from the main LEDs and is associated with the control circuitry to facilitate monitoring of the ambient light characteristic. The ambient light sensor may be a specially configured light sensor or another LED that is configured to generate a current indicative of the ambient light characteristic in response to being exposed to the ambient light. If the plurality of LEDs are driven with pulses of current, the ambient light characteristic may be monitored between any two pulses of current. Alternatively, one or more of the main LEDs may be used by the control circuitry to monitor the ambient light characteristic. Again, if the LEDs are driven with pulses of current, the ambient light characteristic may be monitored between any two pulses of current.

In select embodiments, the light having the normal color rendering metric that is provided during normal operation and the light having the reduced color rendering metric during reduced color rendering mode have substantially the same intensity. The lighting component may consume less power when providing the light having the reduced color rendering metric than when providing the light having the normal color rendering metric. The lighting component may also be more efficient when providing the light having the reduced color rendering metric than when providing the light having the normal color rendering metric.

In another embodiment, the control circuitry is configured to initially drive the LEDs to provide light having a normal color rendering metric and then begin monitoring the ambient light characteristic of the ambient light. When the ambient light characteristic of the ambient light reaches a defined threshold, the control circuitry will drive the LEDs to provide light having the reduced color rendering metric.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

The present disclosure relates to a solid-state lighting device that employs at least two different types of LEDs to generate light. Control circuitry of the lighting device is able to monitor ambient light and drive the LEDs based on an ambient light characteristic that is indicative of the color rendering metric of the ambient light. Exemplary color rendering metrics are CRI and CQI. If the ambient light characteristic is indicative of the ambient light having a lower color rendering metric, the control system will drive the LEDs to emit light with a defined color rendering metric. If the ambient light characteristic is indicative of the ambient light having a higher color rendering metric, the control system will drive the LEDs to emit light with a reduced color rendering metric, which is lower than the defined color rendering metric.

Figure 1:
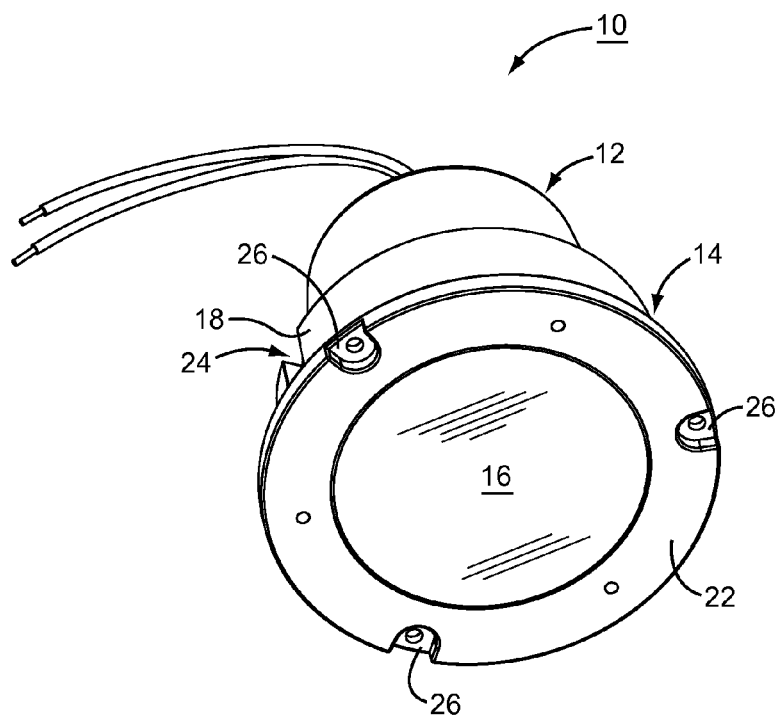
FIG. 1 is an isometric view of the front of an exemplary lighting fixture in which a lighting device according to one embodiment of the disclosure may be implemented.
Figure 2:
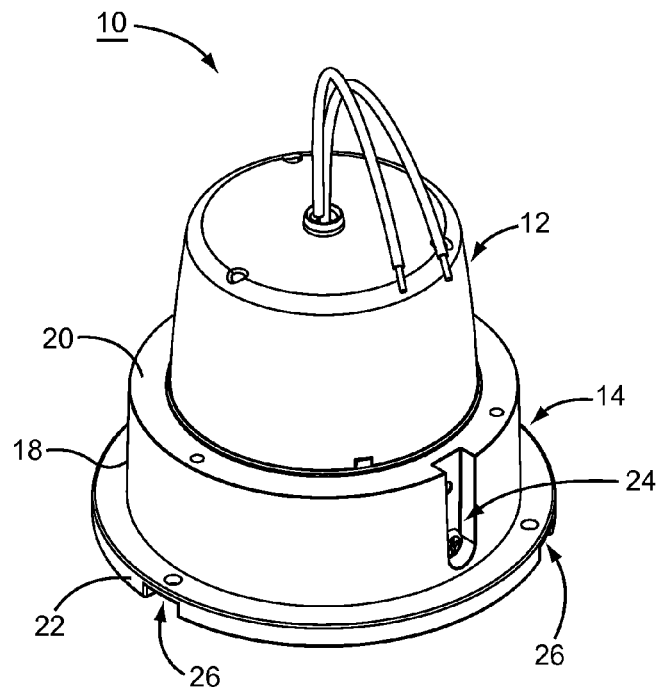
FIG. 2 is an isometric view of the back of the lighting fixture of FIG. 1.

For context and ease of understanding, the following description first describes an exemplary solid-state lighting fixture prior to describing how the solid-state lighting fixture may be configured to function as summarized above. With reference to FIGS. 1 and 2, a unique lighting fixture 10 is illustrated according to one embodiment of the present disclosure. While this particular lighting fixture 10 is used for reference, those skilled in the art will recognize that virtually any type of solid-state lighting fixture may benefit from the subject disclosure.

As shown, the lighting fixture 10 includes a control module 12, a mounting structure 14, and a lens 16. The illustrated mounting structure 14 is cup-shaped and is capable of acting as a heat spreading device; however, different fixtures may include different mounting structures 14 that may or may not act as heat spreading devices. A light source (not shown), which will be described in detail further below, is mounted inside the mounting structure 14 and oriented such that light is emitted from the mounting structure through the lens 16. The electronics (not shown) that are required to power and drive the light source are provided, at least in part, by the control module 12. While the lighting fixture 10 is envisioned to be used predominantly in 4, 5, and 6 inch recessed lighting applications for industrial, commercial, and residential applications, those skilled in the art will recognize that the concepts disclosed herein are applicable to virtually any size lighting device and any type of lighting application.

The lens 16 may include one or more lenses that are made of clear or transparent materials, such as polycarbonate (PC), acrylic (PMMA), glass, or any other suitable material. As discussed further below, the lens 16 may be associated with a diffuser for diffusing the light emanating from the light source and exiting the mounting structure 14 via the lens 16. Further, the lens 16 may also be configured to shape or direct the light exiting the mounting structure 14 via the lens 16 in a desired manner.

The control module 12 and the mounting structure 14 may be integrated and provided by a single structure. Alternatively, the control module 12 and the mounting structure 14 may be modular wherein different sizes, shapes, and types of control modules 12 may be attached, or otherwise connected, to the mounting structure 14 and used to drive the light source provided therein.

In the illustrated embodiment, the mounting structure 14 is cup-shaped and includes a sidewall 18 that extends between a bottom panel 20 at the rear of the mounting structure 14, and a rim, which may be provided by an annular flange 22 at the front of the mounting structure 14. One or more elongated slots 24 may be formed in the outside surface of the sidewall 18. There are two elongated slots 24, which extend parallel to a central axis of the lighting fixture 10 from the rear surface of the bottom panel 20 toward, but not completely to, the annular flange 22. The elongated slots 24 may be used for a variety of purposes, such as providing a channel for a grounding wire that is connected to the mounting structure 14 inside the elongated slot 24, connecting additional elements to the lighting fixture 10, or as described further below, securely attaching the lens 16 to the mounting structure 14.

The annular flange 22 may include one or more mounting recesses 26 in which mounting holes are provided. The mounting holes may be used for mounting the lighting fixture 10 to a mounting structure or for mounting accessories to the lighting fixture 10. The mounting recesses 26 provide for counter-sinking the heads of bolts, screws, or other attachment means below or into the front surface of the annular flange 22.

Figure 3:
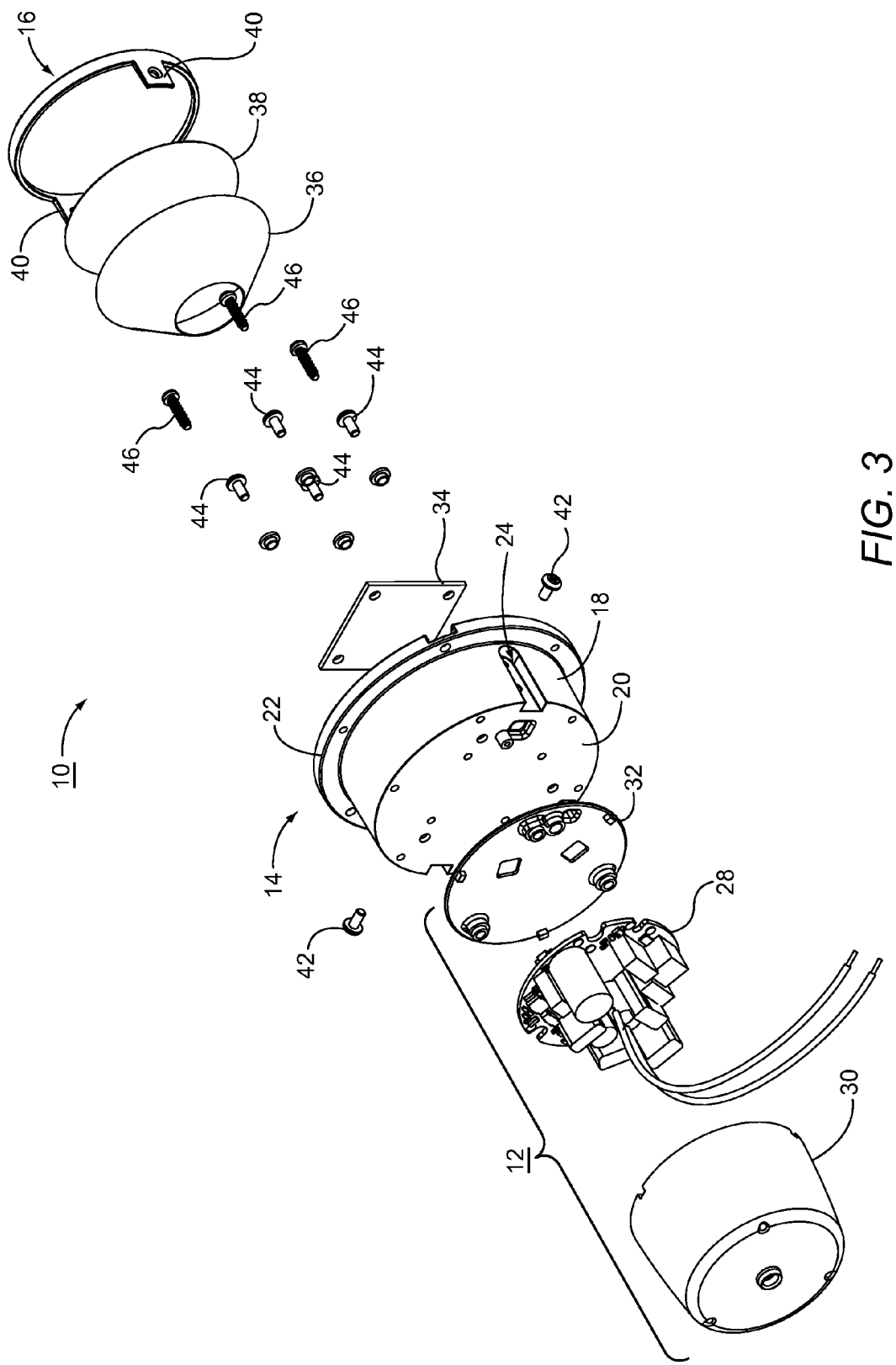
FIG. 3 is an exploded isometric view of the lighting fixture of FIG. 1.

With reference to FIG. 3, an exploded view of the lighting fixture 10 of FIGS. 1 and 2 is provided. As illustrated, the control module 12 includes control module electronics 28, which are enclosed by a control module housing 30 and a control module cover 32. The control module housing 30 is cup-shaped and sized sufficiently to receive the control module electronics 28. The control module cover 32 provides a cover that extends substantially over the opening of the control module housing 30. Once the control module cover 32 is in place, the control module electronics 28 are contained within the control module housing 30 and the control module cover 32. The control module 12 is, in the illustrated embodiment, mounted to the rear surface of the bottom panel 20 of the mounting structure 14.

The control module electronics 28 may be used to provide all or a portion of power and control signals necessary to power and control the light source 34, which may be mounted on the front surface of the bottom panel 20 of the mounting structure 14 as shown, or in an aperture provided in the bottom panel 20 (not shown). Aligned holes or openings in the bottom panel 20 of the mounting structure 14 and the control module cover 32 are provided to facilitate an electrical connection between the control module electronics 28 and the light source 34. In an alternative embodiment (not shown), the control module 12 may provide a threaded base that is configured to screw into a conventional light socket wherein the lighting fixture resembles or is at least a compatible replacement for a conventional light bulb. Power to the lighting fixture 10 would be provided via this base.

In the illustrated embodiment, the light source 34 is solid state and employs light emitting diodes (LEDs) and associated electronics, which are mounted to a printed circuit board (PCB) to generate light at a desired color, intensity and color temperature. The LEDs are mounted on the front side of the PCB while the rear side of the PCB is mounted to the front surface of the bottom panel 20 of the mounting structure 14 directly or via a thermally conductive pad (not shown). In this embodiment, the thermally conductive pad has a low thermal resistivity, and therefore, efficiently transfers heat that is generated by the light source 34 to the bottom panel 20 of the mounting structure 14.

While various mounting mechanisms are available, the illustrated embodiment employs four bolts 44 to attach the PCB of the light source 34 to the front surface of the bottom panel 20 of the mounting structure 14. The bolts 44 screw into threaded holes provided in the front surface of the bottom panel 20 of the mounting structure 14. Three bolts 46 are used to attach the mounting structure 14 to the control module 12. In this particular configuration, the bolts 46 extend through corresponding holes provided in the mounting structure 14 and the control module cover 32 and screw into threaded apertures (not shown) provided just inside the rim of the control module housing 30. As such, the bolts 46 effectively sandwich the control module cover 32 between the mounting structure 14 and the control module housing 30.

A reflector cone 36 resides within the interior chamber provided by the mounting structure 14. In the illustrated embodiment, the reflector cone 36 has a conical wall that extends between a larger front opening and a smaller rear opening. The larger front opening resides at and substantially corresponds to the dimensions of front opening in the mounting structure 14 that corresponds to the front of the interior chamber provided by the mounting structure 14. The smaller rear opening of the reflector cone 36 resides about and substantially corresponds to the size of the LED or array of LEDs provided by the light source 34. The front surface of the reflector cone 36 is generally, but not necessarily, highly reflective in an effort to increase the overall efficiency and optical performance of the lighting fixture 10. In certain embodiments, the reflector cone 36 is formed from metal, paper, a polymer, or a combination thereof. In essence, the reflector cone 36 provides a mixing chamber for light emitted from the light source 34 and may be used to help direct or control how the light exits the mixing chamber through the lens 16.

Figure 4:
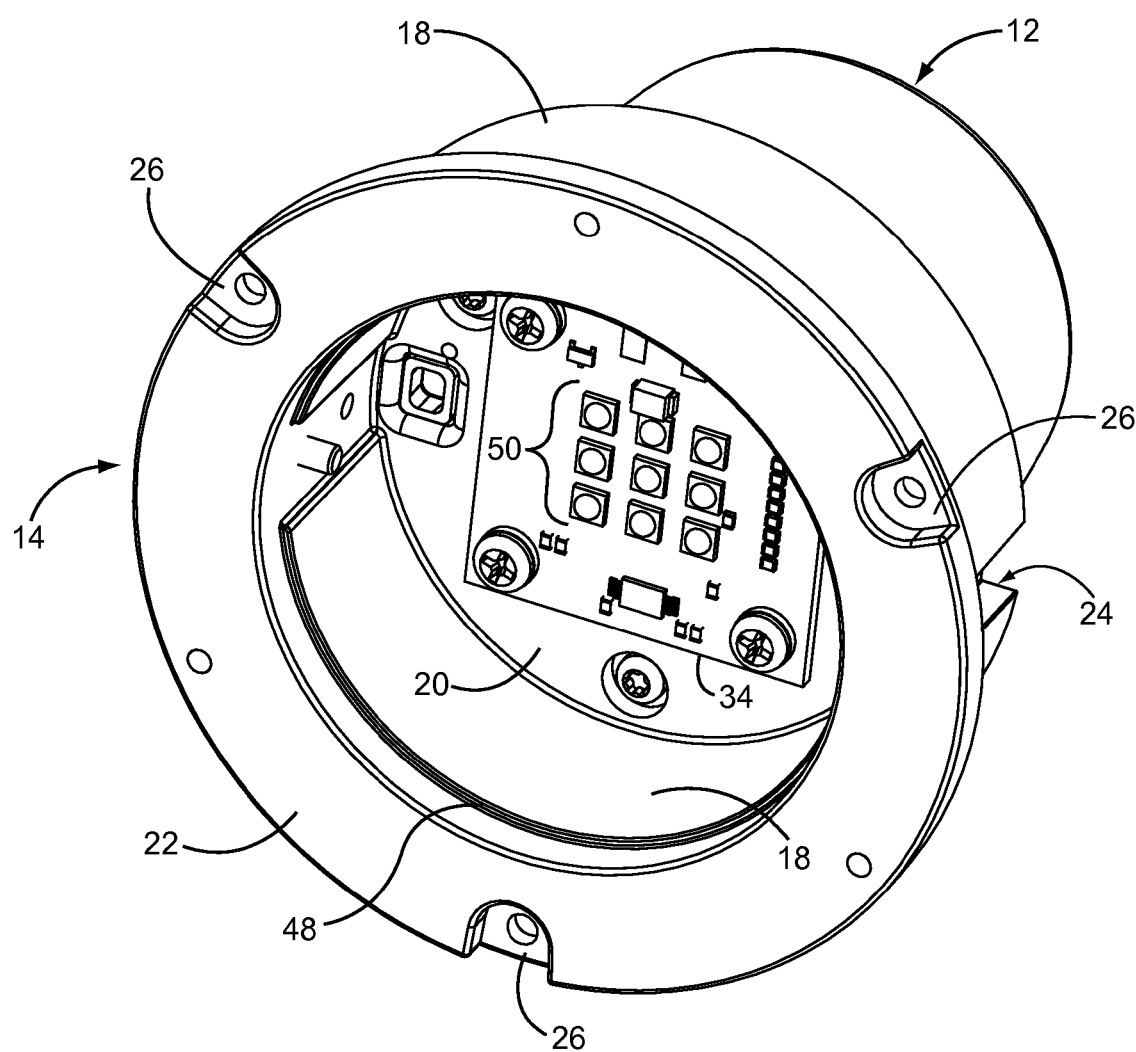
FIG. 4 is an isometric view of the front of the lighting fixture of FIG. 1 without the lens, diffuser, and reflector.
Figure 5:
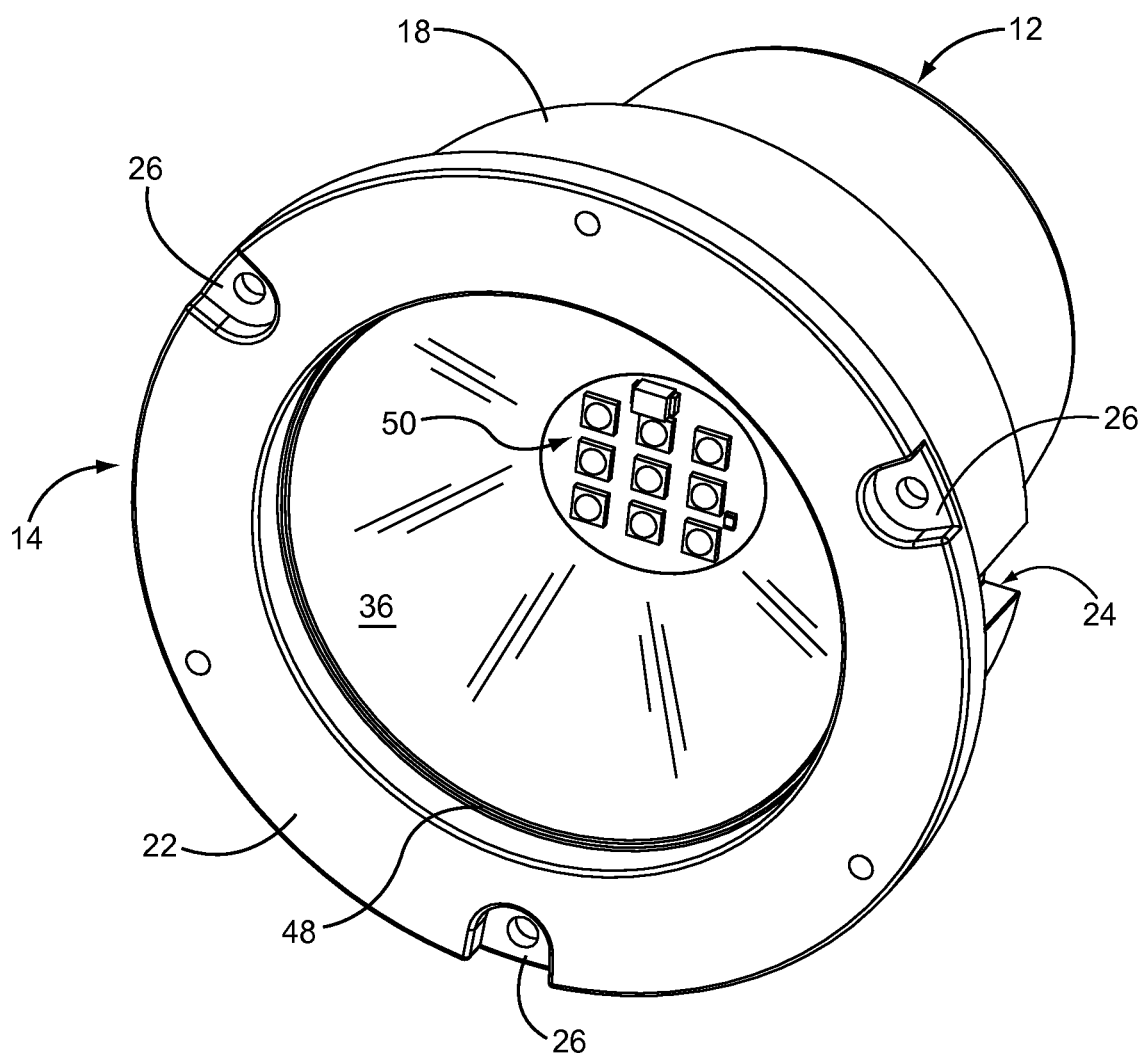
FIG. 5 is an isometric view of the front of the lighting fixture of FIG. 1 without the lens and diffuser.

When assembled, the lens 16 is mounted on or over the annular flange 22 and may be used to hold the reflector cone 36 in place within the interior chamber of the mounting structure 14 as well as hold additional lenses and one or more planar diffusers 38 in place. In the illustrated embodiment, the lens 16 and the diffuser 38 generally correspond in shape and size to the front opening of the mounting structure 14 and are mounted such that the front surface of the lens 16 is substantially flush with the front surface of the annular flange 22. As shown in FIGS. 4 and 5, a recess 48 is provided on the interior surface of the sidewall 18 and substantially around the opening of the mounting structure 14. The recess 48 provides a ledge on which the diffuser 38 and the lens 16 rest inside the mounting structure 14. The recess 48 may be sufficiently deep such that the front surface of the lens 16 is flush with the front surface of the annular flange 22.

Returning to FIG. 3, the lens 16 may include tabs 40, which extend rearward from the outer periphery of the lens 16. The tabs 40 may slide into corresponding channels on the interior surface of the sidewall 18 (see FIG. 4). The channels are aligned with corresponding elongated slots 24 on the exterior of the sidewall 18. The tabs 40 have threaded holes that align with holes provided in the grooves and elongated slots 24. When the lens 16 resides in the recess 48 at the front opening of the mounting structure 14, the holes in the tabs 40 will align with the holes in the elongated slots 24. Bolts 42 may be inserted through the holes in the elongated slots and screwed into the holes provided in the tabs 40 to affix the lens 16 to the mounting structure 14. When the lens 16 is secured, the diffuser 38 is sandwiched between the lens and the recess 48, and the reflector cone 36 is contained between the diffuser 38 and the light source 34. Alternatively, a retention ring (not shown) may attach to the flange 22 of the mounting structure 14 and operate to hold the lens 16 and diffuser 38 in place.

The degree and type of diffusion provided by the diffuser 38 may vary from one embodiment to another. Further, color, translucency, or opaqueness of the diffuser 38 may vary from one embodiment to another. Separate diffusers 38, such as that illustrated in FIG. 3, are typically formed from a thermoplastic, glass, or ceramic, but other materials are viable and will be appreciated by those skilled in the art. Similarly, the lens 16 is planar and generally corresponds to the shape and size of the diffuser 38 as well as the front opening of the mounting structure 14. As with the diffuser 38, the material, color, translucency, or opaqueness of the lens 16 may vary from one embodiment to another. Further, both the diffuser 38 and the lens 16 may be formed from one or more materials or one or more layers of the same or different materials. While only one diffuser 38 and one lens 16 are depicted, the lighting fixture 10 may have multiple diffusers 38 or lenses 16.

For LED-based applications, the light source 34 provides an array of LEDs 50, as illustrated in FIG. 4. FIG. 4 illustrates a front isometric view of the lighting fixture 10, with the lens 16, diffuser 38, and reflector cone 36 removed, such that the light source 34 and the array of LEDs 50 are clearly visible within the mounting structure 14. FIG. 5 illustrates a front isometric view of the lighting fixture 10 with the lens 16 and diffuser 38 removed and the reflector cone 36 in place, such the array of LEDs 50 of the light source 34 are aligned with the rear opening of the reflector cone 36. As noted above, the volume inside the reflector cone 36 and bounded by the rear opening of the reflector cone 36 and the lens 16 or diffuser 38 provides a mixing chamber.

Figure 6:
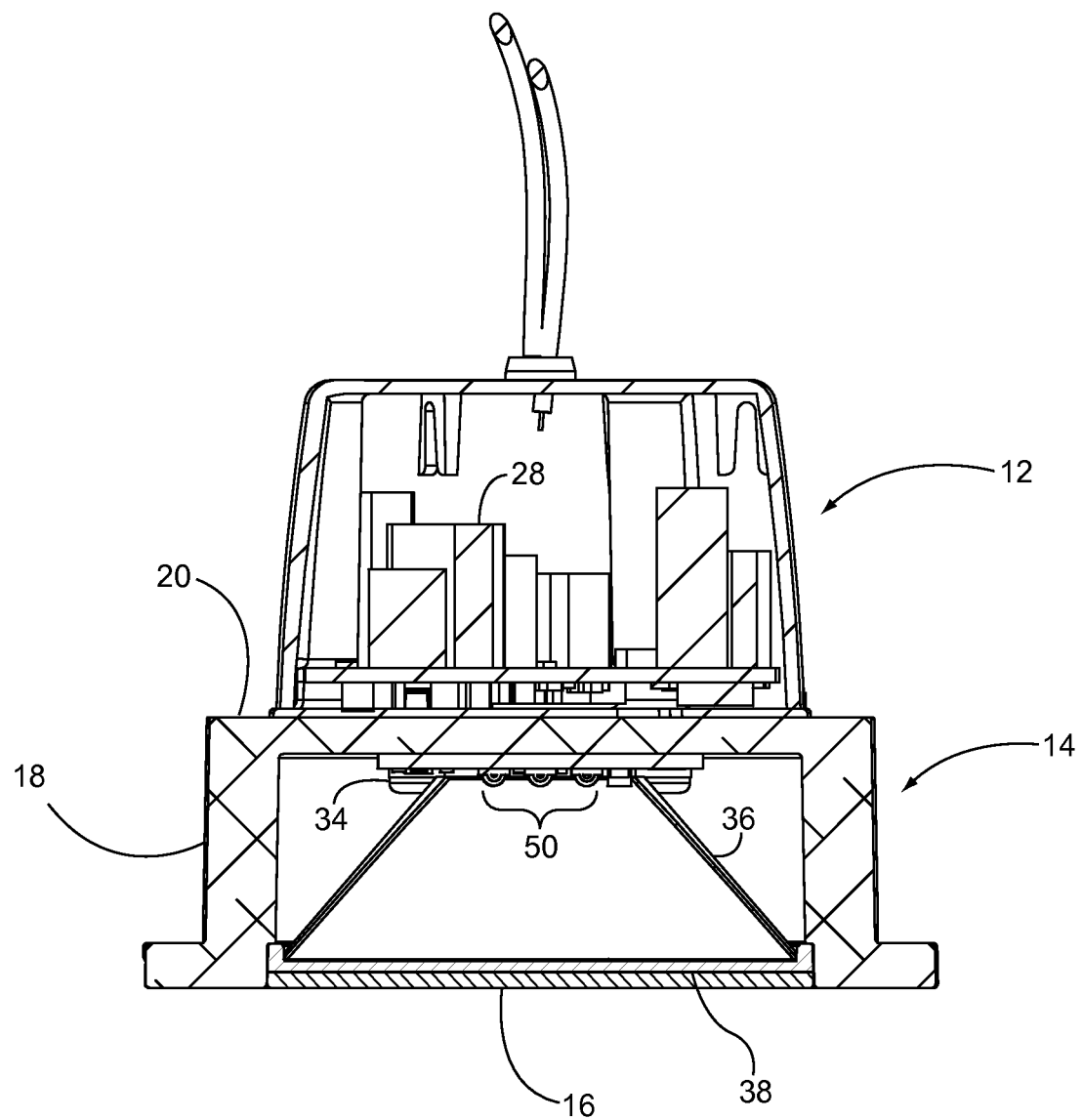
FIG. 6 is a cross sectional view of the lighting fixture of FIG. 5.

Light emitted from the array of LEDs 50 is mixed inside the mixing chamber formed by the reflector cone 36 (not shown) and directed out through the lens 16 in a forward direction to form a light beam. The array of LEDs 50 of the light source 34 may include LEDs 50 that emit different colors of light. For example, the array of LEDs 50 may include both red LEDs that emit reddish light and blue-shifted yellow (BSY) LEDs that emit bluish-yellow light or blue-shifted green (BSG) LEDs that emit bluish-green light, wherein the reddish and bluish-yellow or bluish-green light is mixed to form "white" light at a desired color temperature. In certain embodiments, the array of LEDs may include a large number of red LEDs and BSY or BSG LEDs in various ratios. For example, five or six BSY or BSG LEDs may surround each red LED, and the total number of LEDs may be 25, 50, 100, or more depending on the application. FIGS. 4, 5, and 6 only show 9 LEDs in the array of LEDs for clarity. While red and either BSY or BSG LEDs are provided as an example, various combinations of LEDs may be used. For example, a mixture of red, green, and blue LEDs may be used. Further, the mixture may include different types of LEDs for any given color. For example, the mixture could include different types of blue LEDs and green LEDs with a single type of red LED.

For a uniformly colored beam, relatively thorough mixing of the light emitted from the array of LEDs 50 is desired. Both the reflector cone 36 and the diffusion provided by the diffuser 38 play significant roles in mixing the light emanated from the array of LEDs 50 of the light source 34. In particular, certain light rays, which are referred to as non-reflected light rays, emanate from the array of LEDs 50 and exit the mixing chamber through the diffuser 38 and lens 16 without being reflected off of the interior surface of the reflector cone 36. Other light rays, which are referred to as reflected light rays, emanate from the array of LEDs 50 of the light source 34 and are reflected off of the front surface of the reflector cone 36 one or more times before exiting the mixing chamber through the diffuser 38 and lens 16. With these reflections, the reflected light rays are effectively mixed with each other and at least some of the non-reflected light rays within the mixing chamber before exiting the mixing chamber through the diffuser 38 and the lens 16.

As noted above, the diffuser 38 functions to diffuse, and as result mix, the non-reflected and reflected light rays as they exit the mixing chamber, wherein the mixing chamber and the diffuser 38 provide the desired mixing of the light emanated from the array of LEDs 50 of the light source 34 to provide a light beam of a consistent color. In addition to mixing light rays, the lens 16 and diffuser 38 may be designed and the reflector cone 36 shaped in a manner to control the relative concentration and shape of the resulting light beam that is projected from the lighting fixture 10. For example, a first lighting fixture 10 may be designed to provide a concentrated beam for a spotlight, wherein another may be designed to provide a widely dispersed beam for a floodlight. From an aesthetics perspective, the diffusion provided by the diffuser 38 also prevents the emitted light from looking pixelated and obstructs the ability for a user to see the individual LEDs of the array of LEDs 50.

As provided in the above embodiment, the more traditional approach to diffusion is to provide a diffuser 38 that is separate from the lens 16. As such, the lens 16 is effectively transparent and does not add any intentional diffusion. The intentional diffusion is provided by the diffuser 38. In most instances, the diffuser 38 and lens 16 are positioned next to one another as shown in FIG. 6. However, in other embodiments, the diffusion may be integrated into the lens 16 itself.

Figure 7:
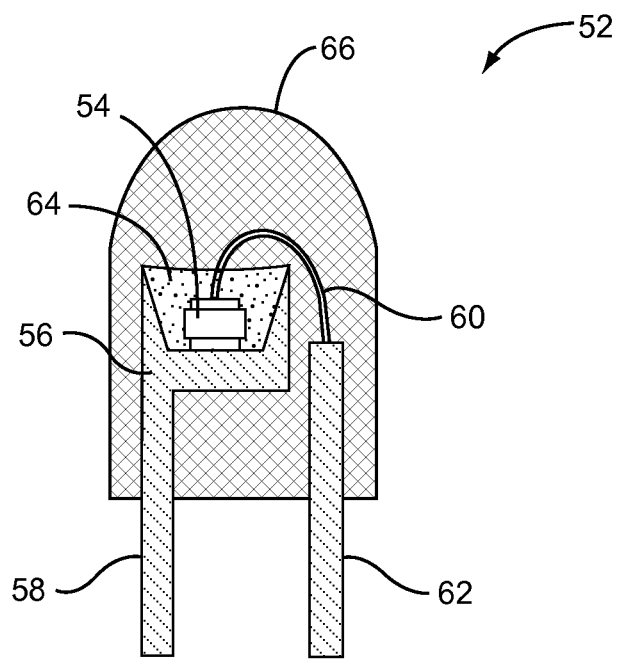
FIG. 7 is a cross-sectional view of a first type of LED architecture.

A traditional package for an LED 52 of the array of LEDs 50 is illustrated in FIG. 7. A single LED chip 54 is mounted on a reflective cup 56 using solder or a conductive epoxy, such that ohmic contacts for the cathode (or anode) of the LED chip 54 are electrically coupled to the bottom of the reflective cup 56. The reflective cup 56 is either coupled to or integrally formed with a first lead 58 of the LED 52. One or more bond wires 60 connect ohmic contacts for the anode (or cathode) of the LED chip 54 to a second lead 62.

The reflective cup 56 may be filled with an encapsulant material 64 that encapsulates the LED chip 54. The encapsulant material 64 may be clear or may contain a wavelength conversion material, such as a phosphor, which is described in greater detail below. The entire assembly is encapsulated in a clear protective resin 66, which may be molded in the shape of a lens to control the light emitted from the LED chip 54.

Figure 8:
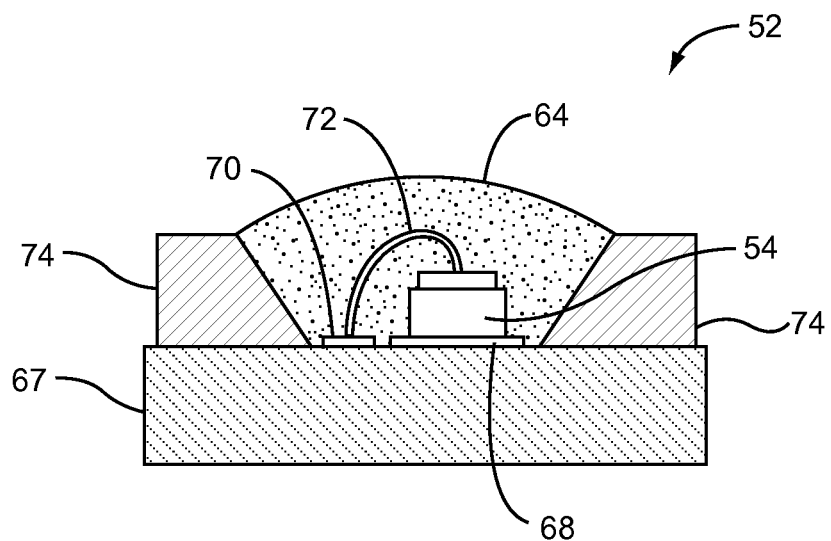
FIG. 8 is a cross-sectional view of a second type of LED architecture.

An alternative package for an LED 52 is illustrated in FIG. 8 wherein the LED chip 54 is mounted on a substrate 67. In particular, the ohmic contacts for the anode (or cathode) of the LED chip 54 are directly mounted to first contact pads 68 on the surface of the substrate 67. The ohmic contacts for the cathode (or anode) of the LED chip 54 are connected to second contact pads 70, which are also on the surface of the substrate 67, using bond wires 72. The LED chip 54 resides in a cavity of a reflector structure 74, which is formed from a reflective material and functions to reflect light emitted from the LED chip 54 through the opening formed by the reflector structure 74. The cavity formed by the reflector structure 74 may be filled with an encapsulant material 64 that encapsulates the LED chip 54. The encapsulant material 64 may be clear or may contain a wavelength conversion material, such as a phosphor.

In either of the embodiments of FIGS. 7 and 8, if the encapsulant material 64 is clear, the light emitted by the LED chip 54 passes through the encapsulant material 64 and the protective resin 66 without any substantial shift in color. As such, the light emitted from the LED chip 54 is effectively the light emitted from the LED 52. If the encapsulant material 64 contains a wavelength conversion material, substantially all or a portion of the light emitted by the LED chip 54 in a first wavelength range may be absorbed by the wavelength conversion material, which will responsively emit light in a second wavelength range. The concentration and type of wavelength conversion material will dictate how much of the light emitted by the LED chip 54 is absorbed by the wavelength conversion material as well as the extent of the wavelength conversion. In embodiments where some of the light emitted by the LED chip 54 passes through the wavelength conversion material without being absorbed, the light passing through the wavelength conversion material will mix with the light emitted by the wavelength conversion material. Thus, when a wavelength conversion material is used, the light emitted from the LED 52 is shifted in color from the actual light emitted from the LED chip 54.

As noted above, the array of LEDs 50 may include a group of BSY or BSG LEDs 52 as well as a group of red LEDs 52. BSY LEDs 52 include an LED chip 54 that emits bluish light, and the wavelength conversion material is a yellow phosphor that absorbs the blue light and emits yellowish light. Even if some of the bluish light passes through the phosphor, the resultant mix of light emitted from the overall BSY LED 52 is yellowish light. The yellowish light emitted from a BSY LED 52 has a color point that falls above the Black Body Locus (BBL) on the 1931 CIE chromaticity diagram wherein the BBL corresponds to the various color temperatures of white light.

Similarly, BSG LEDs 52 include an LED chip 54 that emits bluish light; however, the wavelength conversion material is a greenish phosphor that absorbs the blue light and emits greenish light. Even if some of the bluish light passes through the phosphor, the resultant mix of light emitted from the overall BSG LED 52 is greenish light. The greenish light emitted from a BSG LED 52 has a color point that falls above the BBL on the 1931 CIE chromaticity diagram wherein the BBL corresponds to the various color temperatures of white light.

The red LEDs 52 generally emit reddish light at a color point on the opposite side of the BBL as the yellowish or greenish light of the BSY or BSG LEDs 52. As such, the reddish light from the red LEDs 52 mixes with the yellowish or greenish light emitted from the BSY or BSG LEDs 52 to generate white light that has a desired color temperature and falls within a desired proximity of the BBL. In effect, the reddish light from the red LEDs 52 pulls the yellowish or greenish light from the BSY or BSG LEDs 52 to a desired color point on or near the BBL. Notably, the red LEDs 52 may have LED chips 54 that natively emit reddish light wherein no wavelength conversion material is employed. Alternatively, the LED chips 54 may be associated with a wavelength conversion material, wherein the resultant light emitted from the wavelength conversion material and any light that is emitted from the LED chips 54 without being absorbed by the wavelength conversion material mixes to form the desired reddish light.

The blue LED chip 54 used to form either the BSY or BSG LEDs 52 may be formed from a gallium nitride (GaN), indium gallium nitride (InGaN), zinc selenide (ZnSe), or like material system. The red LED chip 54 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 9A:
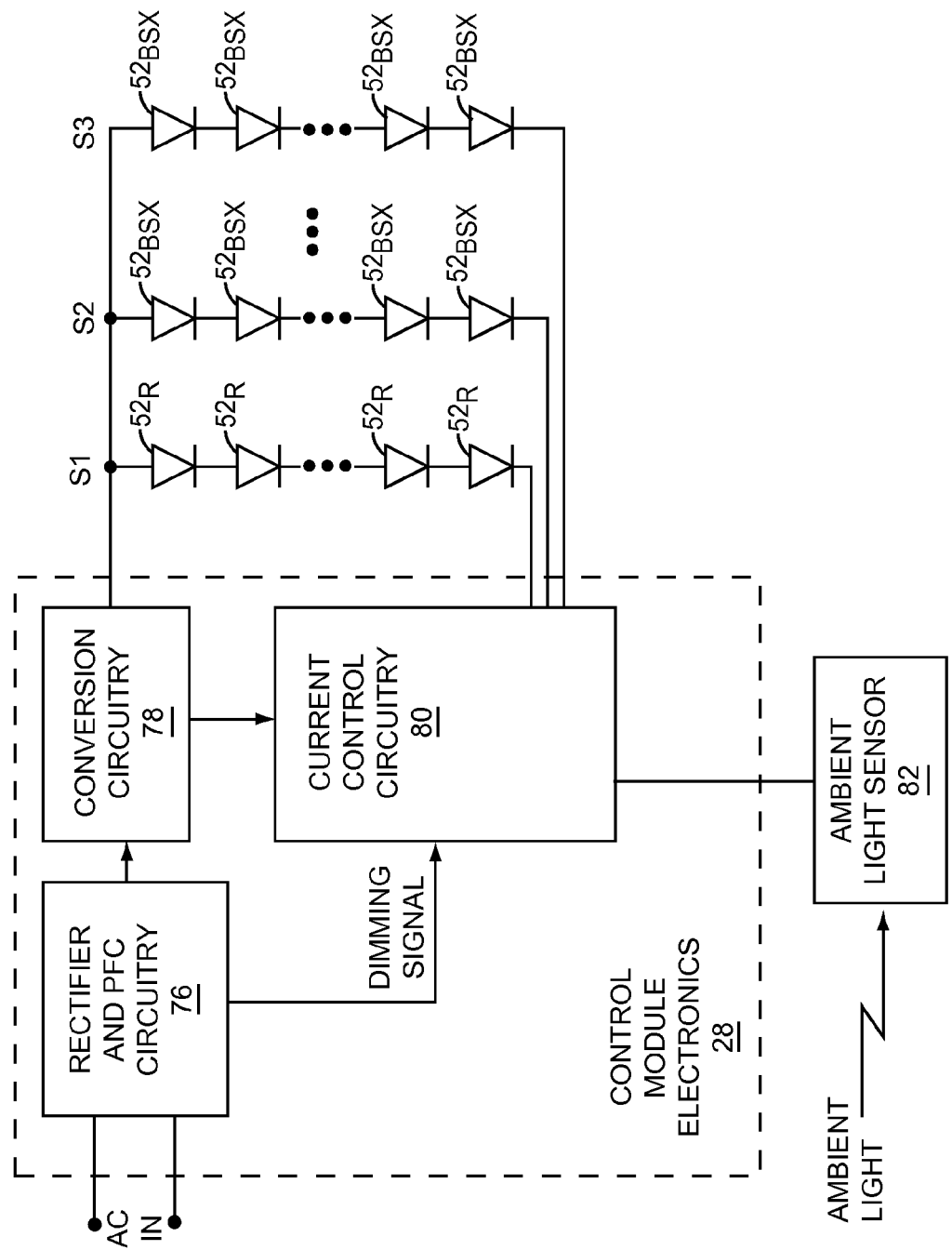
FIG. 9A is a schematic of exemplary control module electronics according to a first embodiment of the disclosure.

The control module electronics 28 for driving the array of LEDs 50 is illustrated in FIG. 9A according to a first embodiment of the disclosure. As illustrated, the array of LEDs 50 may include a mixture of red LEDs 52 and either BSY or BSG LEDs 52. The array of LEDs 50 is electrically divided into two or more strings of series connected LEDs 52. As depicted, there are three LED strings S1, S2, and S3. For clarity, the reference number "52" will include a subscript indicative of the color of the LED 52 in the following text where 'R' corresponds to red, BSY corresponds to blue shifted yellow, BSG corresponds to blue shifted green, and BSX corresponds to either BSG or BSY LEDs. LED string S1 includes a number of red LEDs $52_R$, LED string S2 includes a number of either BSY or BSG LEDs $52_{BSX}$, and LED string S3 includes a number of either BSY or BSG LEDs $52_{BSX}$. The control module electronics 28 control the current delivered to the respective LED strings S1, S2, and S3. The current used to drive the LEDs 52 is generally pulse width modulated (PWM), wherein the duty cycle of the pulsed current controls the intensity of the light emitted from the LEDs 52.

The BSY or BSG LEDs $52_{BSX}$ in the second LED string S2 may be selected to have a slightly more bluish hue (less yellowish or greenish hue) than the BSY or BSG LEDs $52_{BSX}$ in the third LED string S3. As such, the current flowing through the second and third strings S2 and S3 may be tuned to control the yellowish or greenish light that is effectively emitted by the BSY or BSG LEDs $52_{BSX}$ of the second and third LED strings S2, S3. By controlling the relative intensities of the yellowish or greenish light emitted from the differently hued BSY or BSG LEDs $52_{BSX}$ of the second and third LED strings S2, S3, the hue of the combined yellowish or greenish light from the second and third LED strings S2, S3 may be controlled in a desired fashion.

The ratio of current provided through the red LEDs $52_R$ of the first LED string S1 relative to the currents provided through the BSY or BSG LEDs $52_{BSX}$ of the second and third LED strings S2 and S3 may be adjusted to effectively control the relative intensities of the reddish light emitted from the red LEDs $52_R$ and the combined yellowish or greenish light emitted from the various BSY or BSG LEDs $52_{BSX}$. As such, the intensity and the color point of the yellowish or greenish light from BSY or BSG LEDs $52_{BSX}$ can be set relative the intensity of the reddish light emitted from the red LEDs $52_R$. The resultant yellowish or greenish light mixes with the reddish light to generate white light that has a desired color temperature and falls within a desired proximity of the BBL.

The control module electronics 28 depicted in FIG. 9A generally include rectifier and power factor correction (PFC) circuitry 76, conversion circuitry 78, and current control circuitry 80. The rectifier and power factor correction circuitry 76 is adapted to receive an AC power signal (AC IN), rectify the AC power signal, and correct the power factor of the AC power signal. The resultant signal is provided to the conversion circuitry 78, which converts the rectified AC power signal to a DC signal. The DC signal may be boosted or bucked to one or more desired DC voltages by DC-DC converter circuitry, which is provided by the conversion circuitry 78. A DC voltage is provided to the first end of each of the LED strings S1, S2, and S3. The same or different DC voltage is also provided to the current control circuitry 80.

The current control circuitry 80 is coupled to the second end of each of the LED strings S1, S2, and S3. Based on any number of fixed or dynamic parameters, the current control circuitry 80 may individually control the pulse width modulated current that flows through the respective LED strings S1, S2, and S3 such that the resultant white light emitted from the LED strings S1, S2, and S3 has a desired color temperature and falls within a desired proximity of the BBL.

In certain instances, an external dimming device provides the AC power signal. The rectifier and PFC circuitry 76 may be configured to detect the relative amount of dimming associated with the AC power signal and provide a corresponding dimming signal to the current control circuitry 80. Based on the dimming signal, the current control circuitry 80 will adjust the current provided to each of the LED strings S1, S2, and S3 to effectively reduce the intensity of the resultant white light emitted from the LED strings S1, S2, and S3 while maintaining the desired color temperature.

The current control circuitry 80 may also adjust the current provided to one or more of the LED strings S1, S2, and S3 to control the color rendering metric, such as the CRI or CQI, of the resultant white light emitted from the LED strings S1, S2, and S3 at various overall brightness levels, color temperatures, and the like. At a high level, the current control circuitry 80 is able to monitor ambient light that is being provided by another source alone or in combination with the light emitted from the lighting fixture 10 through an ambient light sensor, such as the ambient light sensor 82 shown in FIG. 9A. Based on a select characteristic or set of characteristics of the ambient light that are indicative of the color rendering metric, such as CRI or CQI, of the ambient light, the current control circuitry 80 may adjust the current provided to one or more of the LED strings S1, S2, and S3.

For example, if the ambient light characteristic is indicative of the ambient light having a lower color rendering metric (CRI/CQI), the current control circuitry 80 will drive the LED strings S1, S2, and S3 to emit light with a defined color rendering metric. If the ambient light characteristic is indicative of the ambient light having a higher color rendering metric, the current control circuitry 80 will drive the LED strings S1, S2, and S3 to emit light with a reduced color rendering metric, which is lower than the defined color rendering metric.

For instance, when there is no ambient light or ambient light having a lower color rendering metric, the current control circuitry 80 may operate normally and emit light having the defined color rendering metric. In the presence of significant ambient light from sunlight, which naturally has a high color rendering metric, or other source that is capable of providing ambient light with a relatively high color rendering metric, the lighting component may adjust how the LED strings S1, S2, and S3 are driven to emit light at a lower color rendering index. The reduction in the color rendering metric of the emitted light may correspond to an increase in overall system efficiency, efficacy of the emitted light, a reduction in power consumption, or the like while maintaining perceived brightness.

In a system where the color rendering metric is CRI, the current control circuitry 80 may adjust the current in the LED strings S1, S2, and S3 to provide a CRI of 90 or greater when there is no ambient light or when the ambient light is found to have characteristics indicative of the ambient light having a lower or poor CRI. However, the current control circuitry 80 may adjust the current in the LED strings S1, S2, and S3 to provide a CRI of 80 or less when there is a significant amount of ambient light having a relatively high CRI, such as when the ambient light is provided by the sun or high-CRI rated incandescent lighting.

Reasons to reduce the color rendering metric of the light emitted from the lighting fixture 10 in the presence of ambient light that renders colors well is to improve the overall efficiency of the lighting fixture 10, improve the efficacy of the emitted light, reduce power consumption, or the like while maintaining the same intensity, perceived brightness, or the like. The gains in efficiency or reductions in power consumption are due to the fact that it is generally more efficient to generate low quality light than it is high quality light.

For example, BSY or BSG LEDs $52_{BSX}$ in the LED strings S1 and S2 are generally much more efficient than the red LEDs $52_R$ of LED string S3. A significant amount of reddish light from the red LEDs $52_R$ of LED string S3 is required to be mixed with the yellowish or greenish light from the BSY or BSG LEDs $52_{BSX}$ in the LED strings S1 and S2 to provide a resultant white light that renders colors well. If the amount of the red light from the red LEDs $52_R$ of LED string S3 is reduced relative the amount of the yellowish or greenish light, the color rendering capabilities of the resultant light will be reduced. However, if there is a significant amount of high-CRI ambient light available from another source, such as the sun, the reduction in the CRI from the light emitted from the lighting fixture 10 will not be as noticeable, if at all, when the ambient light and the light emitted from the lighting fixture 10 mix with each other in the lighting environment. In essence, the abundance of reddish light in the sunlight may substantially compensate for any reduction in reddish light provided by the lighting fixture 10.

In many instances, the BSY or BSG LEDs $52_{BSX}$ in the LED strings S2 and S3 are very efficient and can be driven the same or harder to increase the output of the yellowish or greenish light and the relatively inefficient red LEDs $52_R$ of LED string S1 may be driven less hard while the overall intensity or perceived brightness of the light output from the lighting fixture 10 remains substantially the same, albeit with less color rendering capabilities. By reducing the reddish light from the red LEDs $52_R$ of LED string S1, the overall efficiency of the lighting fixture 10 may be increased or the overall power consumption of the lighting fixture 10 may be decreased during periods when the lighting fixture 10 does not need to output light having relatively high color rendering capabilities.

In operation, the current control circuitry 80 may initially power on and the drive currents for the red LEDs $52_R$ of LED string S1 and the BSY or BSG LEDs $52_{BSX}$ in the LED strings S2 and S3 such that light with a normal (or higher) CRI, such as 90 or greater, is provided. The current control circuitry 80 will begin monitoring the ambient light via the ambient light sensor 82 and analyze characteristics of the ambient light that would allow the lighting fixture 10 to provide lower CRI light. In the illustrated embodiment, when there is reddish light from sunlight or another remote source, the current control circuitry 80 via the ambient light sensor 82 can detect this condition and respond by reducing the drive current provided to the less efficient red LEDs $52_R$ of LED string S1. The drive currents provided to the BSY or BSG LEDs $52_{BSX}$ in the LED strings S2 and S3 may be maintained, wherein the overall intensity of the light from the lighting fixture 10 is decreased as a result of reducing the amount of reddish light provided by the red LEDs $52_R$ of LED string S1.

To avoid the perceived reduction in intensity of the light from the lighting fixture 10 when the drive current for the red LEDs $52_R$ of LED string S1 is reduced, the drive currents provided to the BSY or BSG LEDs $52_{BSX}$ in the LED strings S2 and S3 may be increased as necessary to maintain the desired level of intensity. In this instance, efficiency is gained or at least power consumption is decreased because of the different efficiency of red LEDs $52_R$ of LED string S1 and the BSY or BSG LEDs $52_{BSX}$ in the LED strings S2 and S3. When the lighting fixture is initially powered on, the current control circuitry 80 may alternatively check the ambient light before providing any drive current to the various LEDs 52. Once the ambient light is analyzed for the presence of reddish light, the current control circuitry 80 may determine whether to provide drive currents to the LEDs 52 for normal (higher) CRI light in the absence of sufficient reddish content in the ambient light or lower CRI light when there is sufficient reddish content in the ambient light.

The ambient light sensor 82 and the current control circuitry 80 may be configured to analyze a limited spectrum of ambient light or analyze a broad spectrum of the ambient light. For example, the relative amounts of the various primary colors, such as red, green, and blue (RGB), may be analyzed based on the type of LEDs 52 being used to generate the light. The LEDs 52 need not be BSY, BSG, or red LEDs. Any combination of two or more types of LEDs 52 may benefit from the concepts provided herein. For example, the LEDs 52 may include a first string of highly efficient white LEDs and a second string of less efficient white LEDs, wherein the light from the highly efficient white LEDs does not render colors nearly as well as the light from the less efficient white LEDs. However, the light from the different white LEDs may be combined to generate high CRI light, if the less efficient white (and better color rendering) LEDs are driven relatively hard.

In the presence of high CRI ambient light, the current control circuitry 80 may reduce the drive currents provided to the less efficient white LEDs and either maintain or increase the drive currents provided to the more efficient (and worse color rendering) LEDs. As a result, the overall efficiency of the lighting fixture 10 is increased or the overall power consumption is reduced by configuring the lighting fixture 10 to provide light with a lower CRI. In general, the lighting fixture 10 is able to respond to ambient lighting conditions that allow it to reduce the overall CRI of the emitted light without being overtly noticeable to the human eye. Of course, the amount of reduction may be continuously variable based on ambient lighting conditions and may be set based on the design objectives of the designer.

Figure 9B:
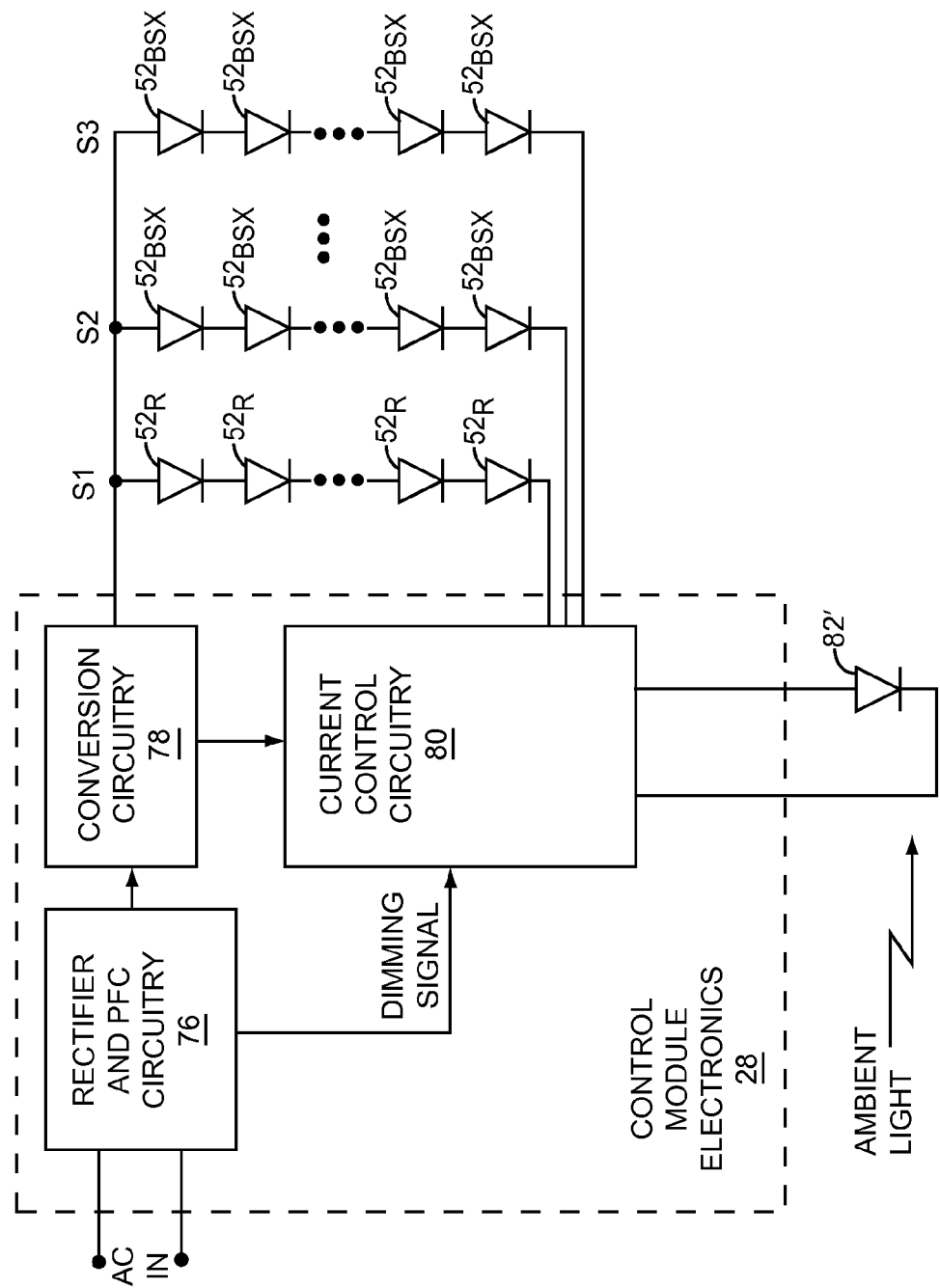
FIG. 9B is a schematic of exemplary control module electronics according to a second embodiment of the disclosure.

As illustrated in FIG. 9B, the ambient lighting sensor 82 (of FIG. 9A) may be another LED 82' that is capable of generating current in response to ambient light, and in particular, to ambient light having a desired color rendering characteristic. For example, the LED 82' may be same or similar to the red LEDs 52$_R$ of LED string S1. As such, in the presence of reddish light that is similar to that emitted from the red LEDs 52$_R$ of LED string S1, the LED 82' will generate current proportional to the amount of reddish light available in the ambient light. When the reddish light in the ambient light exceeds a defined threshold, the drive currents provided to the red LEDs 52$_R$ of LED string S1 may be reduced a certain amount. Alternatively, the drive currents provided to the red LEDs 52$_R$ of LED string S1 may be inversely varied in proportion to the amount of reddish light available in the ambient light. As such, the CRI of the overall light of the lighting fixture 10 may be reduced in a step-wise fashion in one or more steps or may be continuously varied based on the amount of reddish light available in the ambient light. Since the LEDs 52 may be driven with current pulses of a PWM signal, the current control circuitry may monitor the amount of reddish light or other characteristic of the ambient light via the LED 82' in between current pulses being provided to the LEDs 52.

Figure 9C:
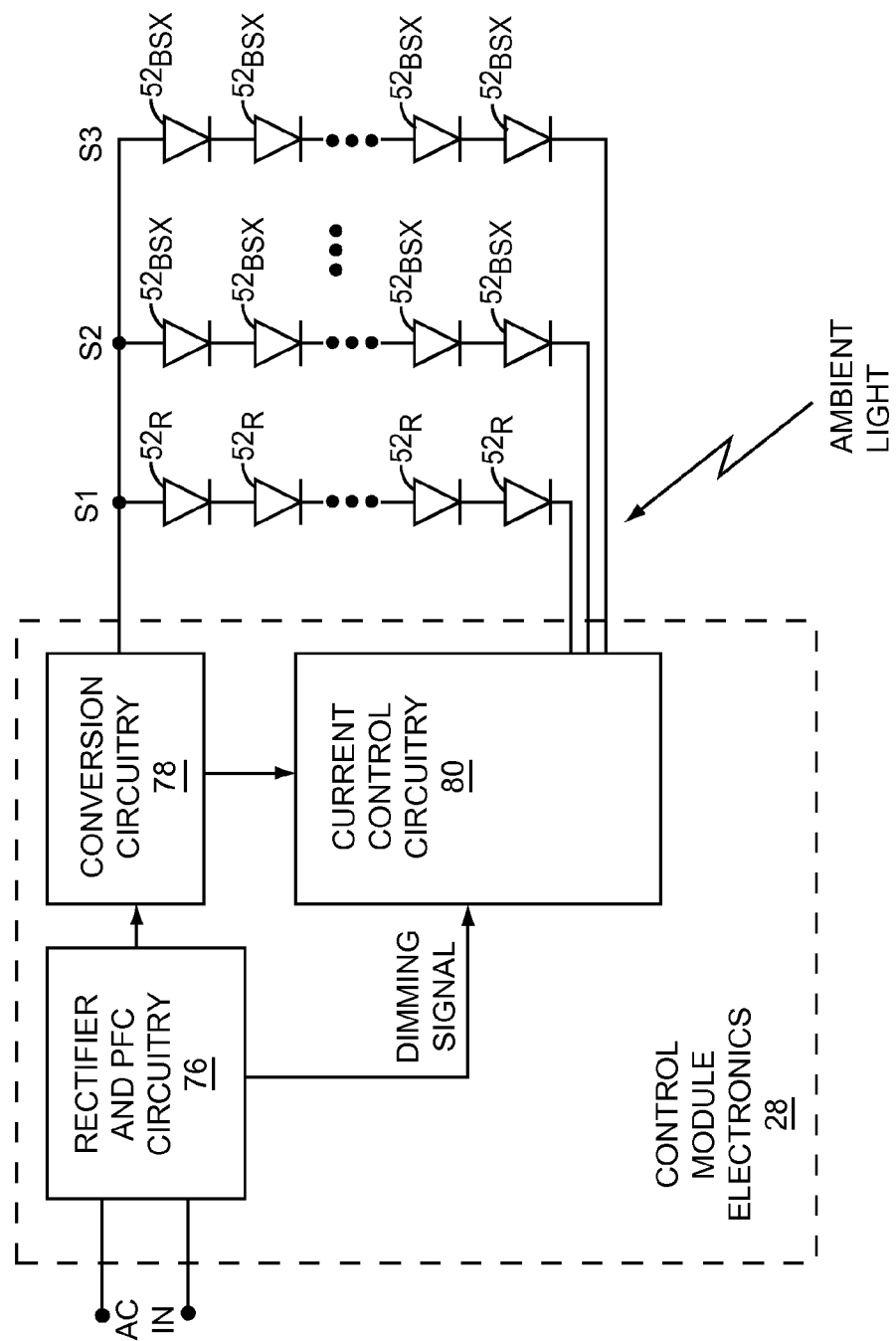
FIG. 9C is a schematic of exemplary control module electronics according to a third embodiment of the disclosure.

In certain embodiments, certain of the LEDs 52 may be used to both emit light as well as monitor a characteristic of the ambient light. One such arrangement is shown in FIG. 9C. For example, one or more of the red LEDs 52$_R$, which are used to emit reddish light when presented the current pulses via the string S1, may be used to monitor the amount of reddish light in the ambient light between the current pulses. Based on the amount of the reddish light in the ambient light, the current control circuitry 80 can control the amount of drive current provided to the red LEDs 52$_R$ of LED string S1 as well as the BSY or BSG LEDs 52$_{BSX}$ in the LED strings S2 and S3 to vary the CRI of the overall light emitted from the lighting fixture 10 in a controlled fashion based on the ambient light.

Figure 9D:
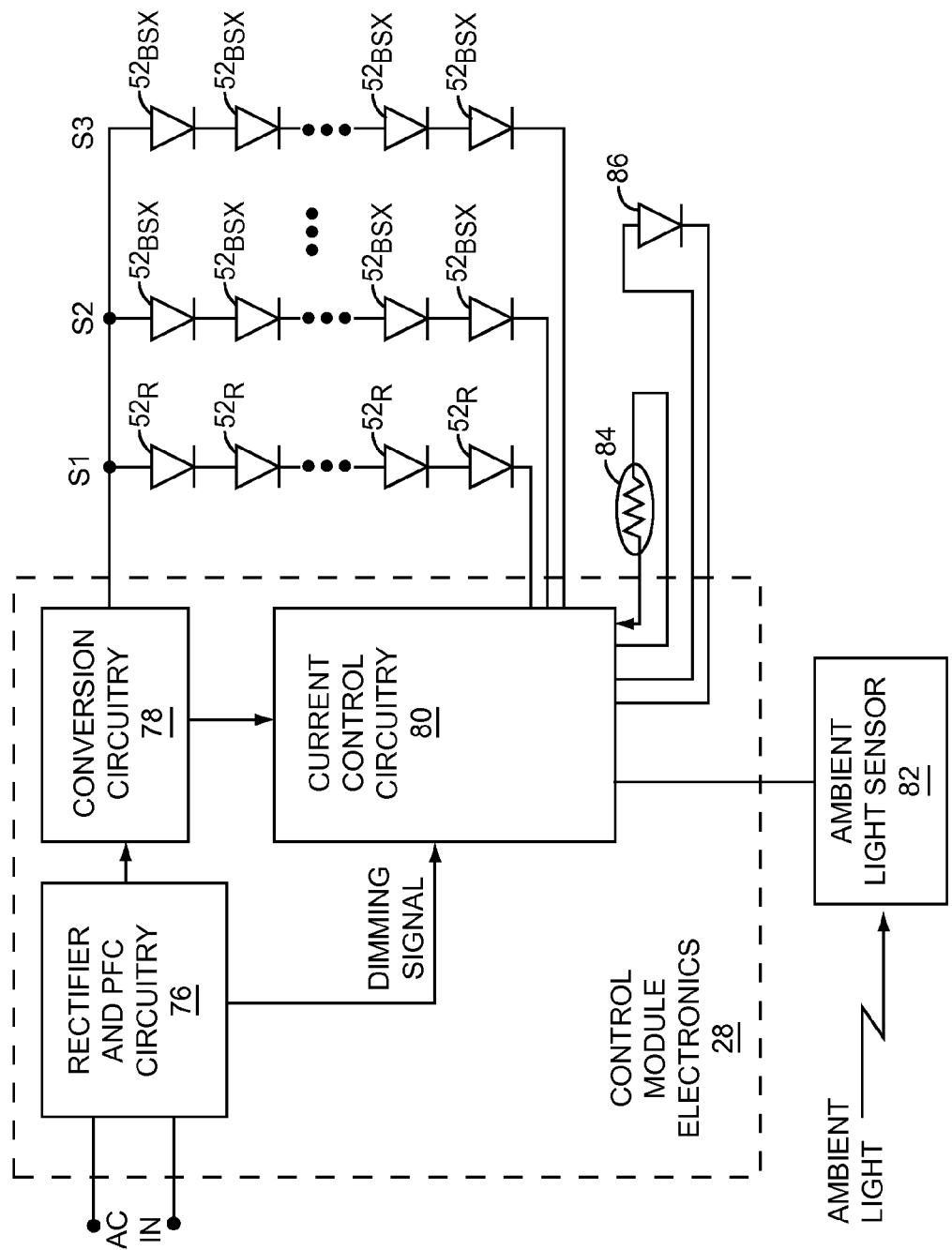
FIG. 9D is a schematic of exemplary control module electronics according to a fourth embodiment of the disclosure.

With reference to FIG. 9D, the intensity or color of the light emitted from the LEDs 52 may be affected by ambient temperature. If associated with a thermistor 84 or other temperature sensing device, the current control circuitry 80 can control the current provided to each of the LED strings S1, S2, and S3 based on ambient temperature in an effort to compensate for adverse temperature effects. The intensity or color of the light emitted from the LEDs 52 may also change over time. If associated with an optical sensor 86, the current control circuitry 80 can measure the color of the resultant white light being generated by the LED strings S1, S2, and S3 and adjust the current provided to each of the LED strings S1, S2, and S3 to ensure that the resultant white light maintains a desired color temperature.

While CRI was used as an exemplary color rendering metric for the above example, CQS or other desired metric is applicable to the concepts provided herein. Those skilled in the art will recognize improvements and modifications to the embodiments of the present disclosure. All such improvements and modifications are considered within the scope of the concepts disclosed herein and the claims that follow.

What is claimed is:

1. A lighting component comprising:
   a plurality of LEDs arranged to produce LED light emissions;
   at least one sensor configured to detect a condition indicative of an ambient light characteristic, wherein the at least one sensor is configured to produce at least one sensor signal; and
   control circuitry arranged to drive the plurality of LEDs, wherein the control circuitry, responsive to the at least one sensor signal, is configured to adjust a color rendering metric of the LED light emissions based on the ambient light characteristic;
   wherein:
      the plurality of LEDs comprises at least one first emitter comprising a blue shifted yellow or a blue shifted green LED, and at least one second emitter comprising a blue shifted yellow or a blue shifted green LED;
      the at least one second emitter provides emissions having a different color point than emissions provided by the at least one first emitter; and
      the control circuitry is configured to drive the at least one first emitter independently from the at least one second emitter.

2. The lighting component of claim 1, wherein the at least one sensor comprises an ambient light sensor.

3. The lighting component of claim 1, wherein the at least one sensor comprises an optical sensor arranged to detect a condition indicative of illumination generated by the lighting component.

4. The lighting component of claim 1, wherein the at least one sensor comprises a temperature sensor.

5. The lighting component of claim 1, wherein the plurality of LEDs further comprises at least one third emitter comprising a reddish LED, and the control circuitry is configured to drive the at least one third emitter independently from the at least one first emitter and the at least one second emitter.

6. A lighting component, comprising:
   a plurality of LEDs arranged to produce LED light emissions;
   at least one sensor configured to detect a condition indicative of an ambient light characteristic, wherein the at least one sensor is configured to produce at least one sensor signal; and
   control circuitry arranged to drive the plurality of LEDs, wherein the control circuitry, responsive to the at least one sensor signal, is configured to adjust a color rendering metric of the LED light emissions based on the ambient light characteristic;
   wherein:
      the control circuitry is configured to drive the plurality of LEDs to provide LED light emissions having a normal color rendering metric, if the at least one sensor signal indicates that the ambient light characteristic has a lower color rendering metric;
      the control circuitry is configured to drive the plurality of LEDs to provide LED light emissions having a reduced color rendering metric, if the at least one sensor signal indicates that the ambient light characteristic has a higher color rendering metric; and
      the reduced color rendering metric is lower than the normal color rendering metric.

7. The lighting component of claim 6, wherein the LED light emissions having the normal color rendering metric and the LED light emissions having the reduced color rendering metric have substantially a same intensity.

8. The lighting component of claim 6, wherein the lighting component consumes less power when providing the LED light emissions having the reduced color rendering metric than when providing the LED light emissions having the normal color rendering metric.

9. A method for operating a lighting component including a plurality of LEDs, the method comprising:
utilizing at least one sensor to detect a condition indicative of an ambient light characteristic, wherein the at least one sensor produces at least one sensor signal;
driving the plurality of LEDs with control circuitry, responsive to the at least one sensor signal, to adjust a color rendering metric of LED light emissions based on the ambient light characteristic;
driving, with the control circuitry, at least one first emitter of the plurality of LEDs independently from at least one second emitter of the plurality of LEDs, the at least one first emitter comprising a blue shifted yellow or a blue shifted green LED, and the at least one second emitter comprising a blue shifted yellow or a blue shifted green LED;
providing, by the at least one first emitter, emissions having a color point; and
providing, by the at least one second emitter, emissions having a different color point than the emissions provided by the at least one first emitter.

10. The method of claim 9, wherein the at least one sensor is utilized to detect a condition indicative of illumination generated by the lighting component.

11. The method of claim 10, wherein the at least one sensor comprises an optical sensor.

12. The method of claim 9, wherein the at least one sensor comprises an ambient light sensor.

13. The method of claim 9, wherein the at least one sensor comprises a temperature sensor.

14. The method of claim 9, further comprising driving at least one third emitter of the plurality of LEDs independently from the at least one first emitter and the at least one second emitter, wherein the at least one third emitter comprises a reddish LED.

15. A method for operating a lighting component including a plurality of LEDs, the method comprising:
utilizing at least one sensor to detect a condition indicative of an ambient light characteristic, wherein the at least one sensor produces at least one sensor signal;
driving the plurality of LEDs with control circuitry, responsive to the at least one sensor signal, to adjust a color rendering metric of LED light emissions based on the ambient light characteristic;
driving the plurality of LEDs to provide LED light emissions having a normal color rendering metric, if the at least one sensor signal indicates that the ambient light characteristic has a lower color rendering metric; and
driving the plurality of LEDs to provide LED light emissions having a reduced color rendering metric, if the at least one sensor signal indicates that the ambient light characteristic has a higher color rendering metric;
wherein the reduced color rendering metric is lower than the normal color rendering metric.

16. The method of claim 15, wherein the LED light emissions having the normal color rendering metric and the LED light emissions having the reduced color rendering metric have substantially a same intensity.

17. The method of claim 15, wherein the lighting component consumes less power when providing the LED light emissions having the reduced color rendering metric than when providing the LED light emissions having the normal color rendering metric.

18. A lighting component comprising:
a plurality of LEDs arranged to produce LED light emissions; and
control circuitry arranged to drive the plurality of LEDs; wherein:
the control circuitry is arranged to receive at least one signal, and the control circuitry is configured to adjust a color rendering metric of the LED light emissions responsive to the at least one signal;
the control circuitry is configured to drive the plurality of LEDs to provide LED light emissions having a normal color rendering metric, if the at least one signal is indicative of a condition in which ambient illumination has a lower color rendering metric;
the control circuitry is configured to drive the plurality of LEDs to provide LED light emissions having a reduced color rendering metric, if the at least one signal is indicative of a condition in which ambient illumination has a higher color rendering metric; and
the reduced color rendering metric is lower than the normal color rendering metric.

19. The lighting component of claim 18, wherein the control circuitry is configured to adjust a color rendering metric of the LED light emissions responsive to the at least one signal while maintaining substantially unchanged at least one of the following items (i) or (ii): (i) intensity of the LED light emissions, or (ii) color temperature of the LED light emissions.

20. The lighting component of claim 18, further comprising at least one sensor configured to detect a condition indicative of at least one of (i) illumination generated by the lighting component or (ii) illumination in a lighting environment proximate to the lighting component.

* * * * *